United States Patent [19]
Buchstaller

[11] 3,724,785
[45] Apr. 3, 1973

[54] ARRANGEMENT OF JET LIFT ENGINES IN AIRCRAFT

[75] Inventor: Anton Buchstaller, Friedrichshafen, Germany

[73] Assignee: Dornier A.G., Friedrichshafen/Bodensee, Germany

[22] Filed: Apr. 28, 1971

[21] Appl. No.: 138,248

[30] Foreign Application Priority Data

July 4, 1970   Germany.....................P 20 33 218.7

[52] U.S. Cl. .................................244/55, 244/12 A
[51] Int. Cl. ............................................B64d 29/04
[58] Field of Search.....244/55, 53 R, 74, 12 R, 12 A, 244/12 B, 12 D, 91, 119, 13

[56] References Cited

UNITED STATES PATENTS 3,451,647   6/1969   Buchstaller..........................244/53 R
3,122,343   2/1964   Leibach..................................244/55

FOREIGN PATENTS OR APPLICATIONS 801,832   9/1958   Great Britain..........................244/74

OTHER PUBLICATIONS

"Airplane Specification for Northrop Modified T-39A NASA V/STOL Jet Operations Research Airplane," Volume II, Northrop Corporation, NASA Publication N67-34706, Dec., 1967, pages 29 and 43.

Primary Examiner—Milton Buchler
Assistant Examiner—Barry L. Kelmachter
Attorney—James E. Bryan

[57] ABSTRACT

The disclosure is of an arrangement of a jet lift engine in an aircraft, the engine being positioned in a substantially vertically-extending bay in the aircraft fuselage at least partially in the area of the rudder assembly. There are means for supporting the rudder assembly above the bay, and air inlet openings leading into the bay on both sides of the rudder assembly, the openings terminating in a common mixing chamber above the engine.

10 Claims, 6 Drawing Figures

INVENTOR
ANTON BUCHSTALLER

PATENTED APR 3 1973 3,724,785

INVENTOR
ANTON BUCHSTALLER

BY James E. Bryan
ATTORNEY

ARRANGEMENT OF JET LIFT ENGINES IN AIRCRAFT

The present invention relates to the arrangement of jet lift engines in aircraft, whereby the jet lift engines are mounted in closable, vertically or approximately vertically-extending bays within the aircraft fuselage.

In aircraft which include wings for the purpose of producing the aerodynamic lift as well as being adapted to flying in a jet-supported manner due to and by means of jet lift engines, it is advantageous for the lift balance in the vertical and transitional flight phases that the propellent gas jets of the jet lift engines act upon lever arms as long as possible with respect to the center of gravity of the airplane. The jet lift engines should therefore be mounted in the nose and in the tail of the fuselage. For reasons of safety with regard to engine failures, it is necessary in this case to provide at least two jet lift engines in both the nose and the tail of the fuselage. Difficulties result, however, with respect to the accommodation of the jet lift engines. The mounting of jet lift engines in the nose is readily possible in most instances and the air inlet — with the covering flaps being open — can take place there from above without impediment. The tail unit, on the other hand, and particularly the rudder assembly, does not allow for the installation of jet lift engines in the tail of the fuselage as a matter of course.

It is known to so arrange jet propulsion units within the fuselage that the air inlet thereof is positioned ahead of the rudder assembly and so that the propellent gas jets are guided by gas guides and by reversing means for vertically downwardly-directed outlet in the area of the fuselage tail.

Such a construction, however, requires considerable space which is consequently lost as useful space, and losses of thrust due to the reversal of the propellent gas jets must be accepted.

In addition thereto, it is further known to either accommodate jet lift engines in special fuselage reinforcements or bulges on both sides of the fuselage tail and of the rudder assembly, respectively, or so to arrange the jet lift engines that they are adapted to be pivoted and folded in both directions out of receiving bays within the tail.

As compared to this known state of the art, the present invention provides the arrangement of jet lift engines in such a manner that the greatest possible distances from the aircraft center of gravity are obtained and the air inlet to the propulsion units can take place without disturbance so that as uniform an air distribution as possible is achieved at the air inlet cross-section of the propulsion units.

This is obtained, in accordance with the present invention, in that either one or several bays for the installation of jet lift engines within the fuselage tail are provided at least partially in the area of the rudder assembly; in that the rudder assembly is supported by means of a carrier construction of the fuselage formation spanning the bays; and in that the fuselage shell on both sides of the tail unit and the carrier construction, respectively, comprises air inlet openings which terminate in the bays.

By virtue of this inventive construction it is possible to cause the propellent gas jets to discharge at the fuselage tail; in other words, at as great as possible a lever arm with respect to the aircraft center of gravity. The outlet of the propellent gas jets takes place therein directly, i.e., without any gas-guiding means between the propulsion units and the jet nozzle for diverting the propellent gas jets. As a result, the jet lift engines are also accommodated at a point in the fuselage which is not utilizable as useful space, or is to only a limited extent. At the same time, an undisturbed in-flow from above of the drawn-in air can take place when the air inlet flaps are open. Thus, there is no need for any reinforcements or the like, projecting beyond the fuselage contour for the accommodation of the jet lift engines, these elements being disturbing during the transitional flight and the high-speed flight.

Another feature of the present invention is that mixing chambers are formed between the propulsion unit inlet and the contour of the fuselage tail constituted by the flaps and, respectively, the outer fuselage skin, and by the longeron, into which chambers terminate the air inlet openings on both sides of the rudder assembly. It is thereby rendered possible to bring about and effect in the chambers a compensation of the drawn-in air flowing in by way of the two lateral inlet openings prior to the entrance thereof into the propulsion units so that a uniform distribution of air will prevail over the entire inlet cross-section of the propulsion units.

One embodiment according to the present invention is shown in the accompanying drawing, wherein FIG. 1 illustrates the fuselage tail with the tail unit in a side view thereof and partially represented in a longitudinal cross-section;

Figure 1:
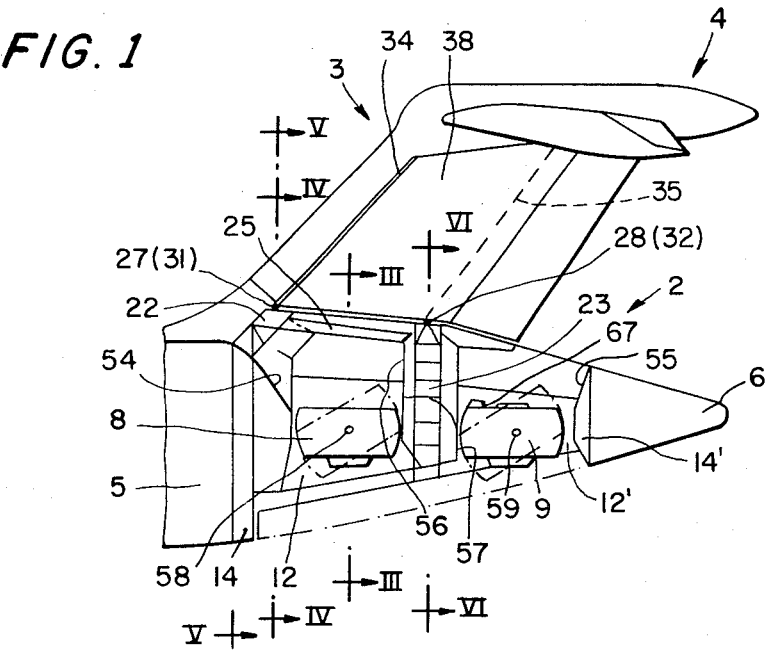
Figure 2:
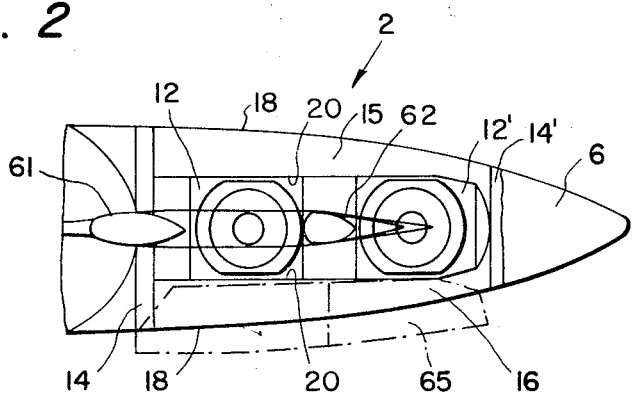
FIG. 2 shows the fuselage tail in a partial longitudinal cross-section, viewed from above.

In FIGS. 1 and 2, reference numeral 2 designates the fuselage tail; reference numeral 3 represents the rudder assembly; reference numeral 4 is used to identify the horizontal tail unit, and reference numeral 5 represents the central fuselage portion. The fuselage end portion 6 adjoins the fuselage tail 2, and between the central fuselage portion 5 and the end portion 6 within the fuselage tail 2 there is a continuous, vertically-directed bay 12 and 12' receiving the jet lift engines 8 and 9. The jet lift engines 8 and 9 are therein arranged in series with respect to the longitudinal airplane axis.

Figure 6:
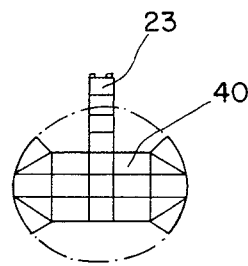
FIG. 6 is a cross-sectional view taken along line VI—VI of FIG. 1.

For purposes of the formation of the bays 12 and 12' for receiving the propulsion units, there extend, starting from a partition bulkhead 14 at the fuselage tail 2 on both sides of the vertical longitudinal central plane of the airplane, two torsion-resistant and bending-resistant lateral shells 15 and 16 which pass over into a rear partition bulkhead 14' of the fuselage tail 2, and by means of this partition bulkhead 14' the fuselage end portion 6 is connected to the fuselage tail 2. The two lateral shells 15 and 16 are constructed as longitudinal box girders and carry the outer fuselage covering 18 as well as the vertical interior longitudinal walls 20. One vertical girder each 22 and 23 being mounted in the vertical longitudinal aircraft plane constitutes a structural unit with the front partition bulkhead 14 and a girder superstructure in the lift engine bay, which will be further described hereinafter. Both vertical girders 22 and 23 receive at the free ends thereof a longitudinal girder or longeron 25 which extends in the direction of the longitudinal central plane and spans the lift engine bays 12 and 12' in a self-supporting fashion. The free ends of the vertical girders 22 and 23 have connections 27 and 28 which are in operative engagement with correspondingly provided connections 31 and 32 at the front spar 34 and, respectively, at the rear spar 35 of the rudder assembly fin 38 for purposes of securing the rudder assembly 3. The lift engine bay consists in this case of a front and of a rear portion 12 and 12', each of which receives one of the two jet propulsion units 8 and 9. The afore-mentioned girder superstructure consists of several box-shaped transverse girders or supports 40 (FIG. 6) which connect the two lateral shells 15 and 16 and with which the rear vertical girder 23 forms a unit.

Figure 3:
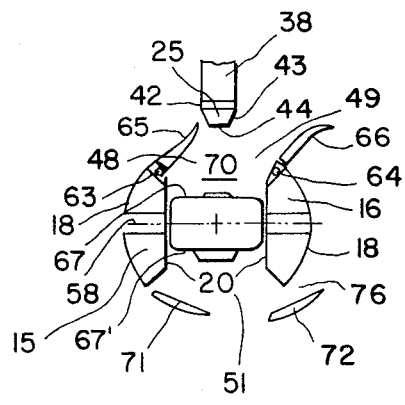
FIG. 3 is a cross-sectional view through the fuselage tail taken along line III—III of FIG. 1.
Figure 4:
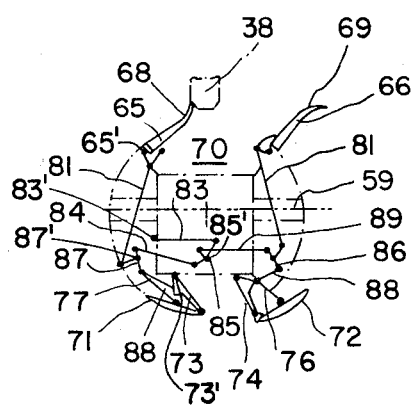
FIG. 4 is a cross-sectional view through the fuselage tail taken along line IV—IV of FIG. 1.
Figure 5:
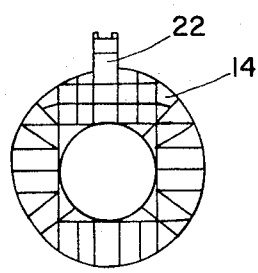
FIG. 5 is a cross-sectional view through the fuselage tail taken along line V—V of FIG. 1.

As is apparent from FIGS. 3 and 4, the longitudinal girder or longeron 25 is constructed as a box girder and has two longitudinal lateral walls 42 and 43 and an end wall 44 which is positioned in the outer contour of the fuselage tail. The two lateral walls 42 and 43 pass over, in the upper edge thereof, into the outer skin of the rudder assembly fin 38 whereas these walls have downwardly tapered inclined sections. Openings 48 and 49 for the air inlet to the jet lift engines 8 and 9 are disposed on both sides of the rudder assembly fin 38 by virtue of a corresponding provision of the lateral shells 15 and 16. Furthermore, the two lateral shells 15 and 16 leave an opening 51 free for the downward discharge of the propellent gas jets of the jet propulsion units. In order to achieve a perfect in-flow of the air being drawn in by the jet propulsion units, the front and, respectively, the rear transverse wall 54 and 55 (FIG. 1) of the propulsion unit bay covering have, from the propulsion unit inlet opening 67 and, respectively, from the propulsion unit outlet opening 67', a funnel-like outwardly diverging inclination (FIG. 1) against the inlet openings 48, 49 and, respectively, the outlet opening 51. Similarly, the transverse girders 40 equally have transverse walls 56 and 57 facing the front and, respectively, the rear part 12 and 12' of the propulsion unit bay. The transverse wall 57 is, curved in the upper area thereof in a manner such as to point away from the propulsion unit 9, while the transverse wall 56 has, in the lower area thereof, an inclination and, respectively, a curvature pointing away from the propulsion unit 8.

By way of bearings 58 and 59, the jet lift engines 8 and 9 are mounted in the bays 12 and 12' so as to be pivotal to a limited extent about axes parallel to the transverse aircraft axis, as indicated in phantom in FIG. 1. The two vertical girders 22 and 23 have a fairing 61 and 62 which is shaped in streamlined fashion with respect to the flying direction.

Positioned at the upper edge of the lateral shells 15 and 16 are closing flaps 65 and 66, which are pivotal about axes 63 and 64 parallel to the longitudinal airplane axis, for the air inlet openings 48 and 49 disposed on both sides of the rudder assembly fin 38. These flaps 65 and 66 are made curved on a part 68 and 69 opposite to the course of the curvature of the outer fuselage contour so that, when the air inlet flaps are in the closed position thereof, a flawless transition from the contour of the fuselage into the contour of the rudder assembly fin 38 is effectively attained.

Disposed within the contour formed by the air inlet flaps 65 and 66, the longeron 25, and the longitudinal inner walls 20 of the lateral shells 15 and 16, and the inlet openings 67 of the jet lift engines 8 and 9, are mixing chambers 70 in which a compensation of the air being drawn in on both sides of the rudder assembly fin 38 by way of the openings 48 and 49 can take place so that a uniform distribution of air will prevail in front of the propulsion unit inlet openings 67. In the open position of the air inlet flaps 65 and 66, the curvature 68 and 69 further contributes to a perfect air inlet guidance on both sides of the rudder assembly 3. The opening 51 for the propellent gas discharge is equally closed off by means of two pairs of flaps 71 and 72. The pairs of flaps 71 and 72 are supported by a parallel construction which is formed by lever gear systems and allows for guiding the pairs of flaps 71 and 72 from the closed into the open position thereof in a parallel or approximately parallel fashion. In the open position, there exists a gap 76 between the fuselage contour and the flaps through which secondary air is drawn in by the discharging propellent gas jet. The control gear and, respectively, the parallel guidance gear for the air inlet and, respectively, the jet exhaust flaps 65 and 66, 71 and 72, respectively, contain in this case a hydraulically-operating control motor (not shown). The control motor is connected by way of a transmission lever 83 and a double lever 85 with distributor rods 84 and 89. The transmission lever 83 is pivotal in the manner of a connecting rod about the universal joint 83' and executes with the piston rod of the hydraulic motor (not shown) a reciprocating movement in the direction of the double lever 85. The distributor rods are hingedly connected with reversing levers 86 and 87. The double lever 85 is pivotal about an axis 85', the reversing lever 87 about an axis 87', the pivoting or rocking lever 73 about an axis 73', and the flap 65 about an axis 65'. Hingedly connected to the reversing levers 86 and 87 are, on the one hand, push rods 81 connected to the air inlet flaps 65 and 66, and on the other hand push rods 88, and the latter act upon the pivoted levers 73 and 74 of the jet discharge flaps 71 and 72. Also mounted at the jet discharge flaps 71 and 72 are parallel-guiding levers 77 which are pivotal about stationary bearings and act upon the afore-mentioned flaps.

When the control motor is actuated, all of the pairs of flaps are displaced simultaneously by way of the gear system described hereinabove, at which time the pairs of flaps in the closed position thereof will assume the position that is indicated on the left half of FIG. 4, and in the open position thereof, the position indicated on the right half of FIG. 4.

When the air inlet flaps 65 and 66 are open, the air which is drawn in by the jet lift engines 8 and 9 enters the mixing chambers 70, via the openings 48 and 49, above the propulsion unit inlet openings 67, and the afore-mentioned mixing chambers 70 will bring about a compensation of the drawn-in air prior to the entrance thereof into the propulsion units 8 and 9. An in-flow of the drawn-in air which is favorable from the point of view of flow or circulation techniques is achieved by virtue of the construction of the air inlet flaps 65 and 66 with the sections 68 and 69 thereof being curved in the open position, as well as by virtue of the funnel-type or funnel-like configuration of the bays 12, and 12– by means of the transverse walls 54 and 55 (FIG. 1). At the same time, a perfect closure of the openings 48 and 49 as well as a technically favorable flow transition from the flaps 65 and 66 into the contour of the rudder assembly fin 38 will ensue, when the air inlet flaps 65 and 66 are in the closed position thereof, by virtue of the specifically shaped sections 68 and 69 of the flaps 65 and 66. In addition thereto, by reason of the streamlined fairing 61 and 62 (FIG. 2) of the vertical girders 22 and 23, a flawless in-flow of the drawn-in air is obtained also during the transitional flight phase. The control gear is accommodated in this case within the two lateral shells 15 and 16 of the fuselage tail 2, is covered by the transverse walls 54 and 55 and the covering of the girder construction 40, and — as a result thereof — will not be positioned within the area of the drawn-in air.

It will be obvious to those skilled in the art that many modifications may be made within the scope of the present invention without departing from the spirit thereof, and the invention includes all such modifications.

What is claimed is:

1. An arrangement of a jet lift engine in an aircraft which comprises a substantially vertically-extending bay in the aircraft fuselage at least partially in the area of the rudder assembly, at least one engine in said bay below said rudder assembly, means supporting the rudder assembly above said bay, and air inlet openings leading into said bay on both sides of said rudder assembly, said openings terminating in a common mixing chamber in said bay above said engine.

2. An arrangement according to claim 1 including flap means for closing the lower end of said bay, said flap means in the open position thereof leaving a gap therebetween and said fuselage for the inflow of secondary air.

3. An arrangement according to claim 1 in which the transverse walls of the bay diverge toward the inlet and outlet openings thereof.

4. An arrangement according to claim 1 in which the means supporting the rudder assembly comprises vertical girders and a longitudinal girder spanning the bay.

5. An arrangement according to claim 4 including fairing means on said vertical girders.

6. An arrangement according to claim 4 in which the free ends of the vertical girders have connecting means thereon for connection to the rudder assembly.

7. An arrangement according to claim 6 including two substantially vertically-extending bays, and transverse girder means between said bays connecting the two sides of the fuselage and receiving one of said vertical girders.

8. An arrangement according to claim 4 in which the longitudinal girder has a box-like construction and the side walls thereof pass over into the outer contour of the rudder assembly and also serve for contact with the longitudinal edges of air inlet flap means pivotally secured to the sides of the fuselage.

9. An arrangement according to claim 8 in which the flap means have a curved portion over at least a part of their width and being directed opposite to the outer contour of the fuselage tail.

10. An arrangement according to claim 8 including mixing chamber means formed by the space enclosed by the engine inlet, the sides of the fuselage, the flap means, and the longitudinal girder.

* * * * *